United States Patent
Bergervoet et al.

(10) Patent No.: US 6,917,338 B2
(45) Date of Patent: Jul. 12, 2005

(54) PARASITIC ELEMENTS DIVERSITY ANTENNA

(75) Inventors: Jozef Reinerus Maria Bergervoet, Eindhoven (NL); Wilhelmus Mathias Clemens Dolmans, Eindhoven (NL); Lukas Leyten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/497,338

(22) PCT Filed: Nov. 26, 2002

(86) PCT No.: PCT/IB02/05017
§ 371 (c)(1),
(2), (4) Date: Jun. 1, 2004

(87) PCT Pub. No.: WO03/049321
PCT Pub. Date: Jun. 12, 2003

(65) Prior Publication Data
US 2005/0064824 A1 Mar. 24, 2005

(30) Foreign Application Priority Data
Dec. 6, 2001 (EP) ............................................ 01204723

(51) Int. Cl.$^7$ .............................. H01Q 1/24; H01Q 3/24
(52) U.S. Cl. .................... 343/702; 343/876; 455/277.1; 455/101
(58) Field of Search ................................. 343/702, 876, 343/853; 455/277.1, 101, 560, 78; H01Q 1/24, 3/24

(56) References Cited

U.S. PATENT DOCUMENTS

| | | | | |
|---|---|---|---|---|
| 4,752,968 A | * | 6/1988 | Lindenmeier et al. | ... 455/277.2 |
| 6,040,803 A | * | 3/2000 | Spall | .................... 343/700 MS |
| 6,211,830 B1 | * | 4/2001 | Monma et al. | ............. 343/702 |
| 2002/0025793 A1 | * | 2/2002 | Meijer et al. | ............. 455/277.1 |

* cited by examiner

*Primary Examiner*—Hoanganh Le
(74) *Attorney, Agent, or Firm*—Aaron Waxler

(57) ABSTRACT

The invention relates to an antenna diversity comprising a first and a second antenna element one of which is operated in an active mode whereas the other one of which is operated in a parasitic mode. It is the object of the present invention to further minimize the amount of mismatch by still being able to maximize a predetermined signal quality criterion for the electromagnetic signal on the active path between the active antenna and the transceiver. This object is solved by a switching unit 120 for either operating the first antenna element in the parasitic mode and simultaneously operating the second antenna element in the active mode or vice versa and by providing a pre-selection unit 130 as well as a selection unit 140 for selecting an optimal configuration for the antenna diversity ensuring that the amount of said mismatch is below a predetermined threshold value and that simultaneously a predetermined quality criterion for the transceived electromagnetic signal is fulfilled best. The antenna diversity further comprises a control unit 150 for adjusting said selected configuration. The invention further relates to a method for operating such an antenna diversity.

4 Claims, 2 Drawing Sheets

PARASITIC ELEMENTS DIVERSITY ANTENNA

This application is a 371 of PCT/IB02/05017 filed on Nov. 26, 2002, published on Jun. 12, 2003 under publication number WO 03/049321 A1 and claims priority benefits of European Patent Application No. 01204723. 9 filed Dec. 6, 2001.

The invention relates to an antenna diversity of an electronic device, in particular of a cellular terminal, according to the preamble of claim 1 and to a method for operating said antenna diversity according to the preamble of claim 2.

Antenna diversities are substantially known in the art. In comparison to single antennas the antenna diversities enable an enhanced quality of speech, less dropped calls and extended range even in those hostile signal environments which cause reflections or deflections of radio signals against buildings, tables, chairs, trees etc.

Figure 2:
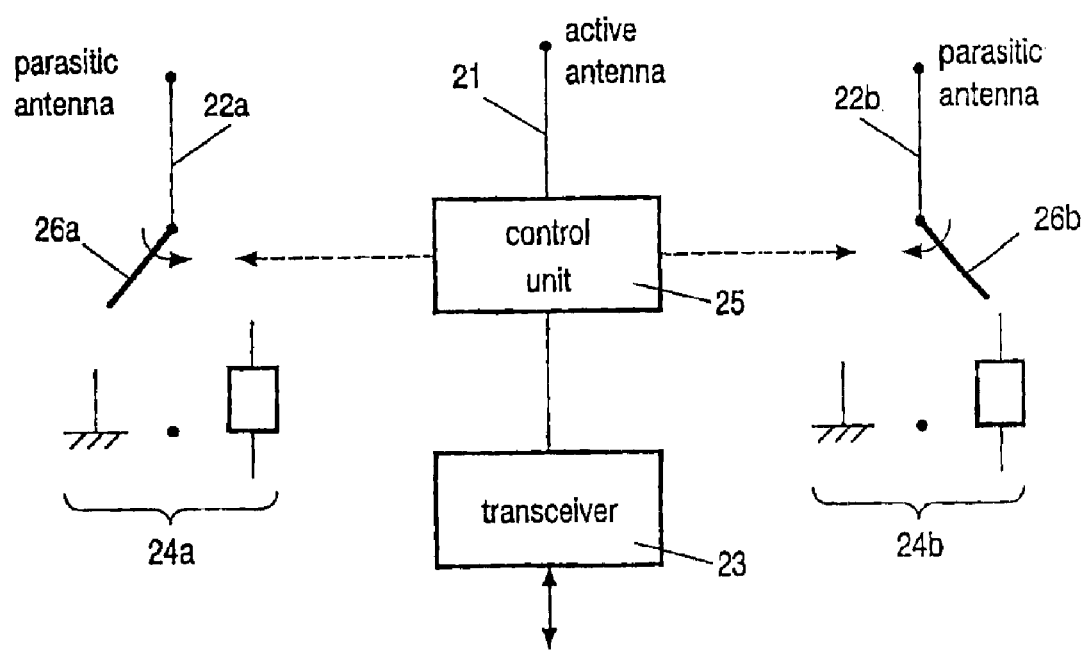

An example for a known antenna diversity is disclosed in the article of Scott, N. L., Leonard-Taylor, M. O. and Vaughan, R. G., "Diversity gain from a single-port adaptive antenna using switched parasitic elements illustrated with a wire and monopole prototype", IEEE Trans. on A & P, vol 47, No. 6, p. 1066–1070, June 1999. The antenna diversity disclosed in said article is shown in FIG. 2 and now briefly discussed.

According to FIG. 2 the antenna diversity comprises one active antenna 21, hereinafter also referred to as an antenna element being operated in an active mode. The diversity further comprises at least 2 parasitic antennas 22a, 22b, hereinafter also referred to as antenna elements being operated in a parasitic mode. Whereas the active antenna 21 is connected to a transceiver 23 the parasitic antennas 22a, 22b are not connected to said transceiver 23. However, the parasitic antennas and the active antenna are located close to each other with the result that there is an electromagnetic coupling between each of the parasitic antennas and the active antenna. The active antenna 21 originally has a fixed impedance (not shown) whereas the impedances 24a, 24b of the parasitic antennas 22a, 22b are individually controllable via a control unit 25 such that the radiation patterns of the signal to be tranceived via the active antenna are optimized, i.e. such that there are only low correlated signals on the antenna.

More specifically, the control unit 25 operates as follows: By controlling the switches 26a and 26b of the parasitic antennas 22a and 22b, the control unit 25 checks different combinations of impedances of the parasitic antennas 22a and 22b with respect to the their coordinated radiation patterns of the electromagnetic signal on the active path, respectively.

The detected values for the strength of the signal are stored in a memory. Finally, that impedance combination which represents the optimal radiation pattern is selected and adjusted by the control unit 25. The described process of testing different impedance combinations of the parasitic antennas in order to detect that combination which ensures the optimal radiation pattern is repeated from time to time in order to update the adjusted impedances of the parasitic antennas if necessary.

In FIG. 2 the two switches 26a and 26b are capable of three impeadance states each, resulting in $3^2$ configurations for the parasitic elements. These various configurations will result in changes to the impedance seen by the active antenna. That disadvantage is avoided, i.e. the impeadance variations are fixed, by restricting the allowed configurations to rotational and reflected symmetry variations on principal configurations.

However, during operation of the antenna diversity according to FIG. 2 there still remains an undesired mismatch between the impedance of the active antenna 21 and impedance of the transceiver 23. Consequently, starting from the mentioned disclosure it is the object of the present invention to further minimize the amount of mismatch by still being able to maximize a predetermined signal quality criterion for the electromagnetic signal on the active path between the active antenna and the transceiver.

This object is solved by the subject matter of claim 1. More specifically, this object is solved by providing for the antenna diversity known in the art a switching unit for either operating the first antenna element in the parasitic mode and simultaneously operating the second antenna element in the active mode or alternatively operating the first antenna element in the active mode and simultaneously operating the second antenna element in the parasitic mode, a pre-selection unit for providing N configurations of the antenna diversity ensuring that the amount of a mismatch between the impedance of the antenna element in the active mode and the impedance of the transceiver is below a predetermined threshold value, respectively, wherein each of said configurations represents a particular position of the switching unit in combination with a particular predetermined amount of the impedance of that antenna element which is—due to the position of said switching unit—operated in the parasitic mode, a selection unit for selecting that single specific configuration out of the plurality of the N configurations provided by the pre-selection unit fulfilling a predetermined signal quality criterion for the transceived electromagnetic signal best, and a control unit for adjusting the position of the switching unit and the amount of the impedance of that antenna element which is—due to the position of the switching unit—operated in the parasitic mode, according to the selected specific configuration.

The predetermined signal quality criterion may e.g. be defined as maximal signal-to-noise ratio and/or as maximal signal strength and/or as maximal signal-to-interference ratio and/or as maximal signal-to-noise-plus-interference ratio.

The described embodiment of the invention has the advantage that due to the adjustment according to the finally selected specific configuration two requirements are fulfilled simultaneously: Firstly, the undesired mismatch is minimized, i.e. below the predetermined threshold value, and consequently, secondly, the degree of performance of the signal quality criterion of the transceived electromagnetic signal on the active path is maximal.

Further, impedance variations, i.e. changes of the impedance of the antenna element in the parasitic mode caused by the control unit can be kept below a predetermined threshold value with the result that in contrast to the prior art they do hardly not have any bad influence to the impedance of the active antenna; consequently, they can be considered as being eliminated.

Finally, according to a preferred embodiment of the invention the antenna diversity of the present invention advantageously only requires one parasitic antenna whereas in the prior art at least two parasitic antennas are required for achieving symmetry. However, nevertheless the technical teaching of the invention might also be applied to a first group and a second group of antenna elements wherein either the first group of antenna elements is operated in the parasitic mode and the second group of antenna elements is simultaneously operated in the active mode or vice versa.

The above identified object of the present invention is further solved by the subject matter of independent method claim 2. The advantages of said method claim correspond to the advantages mentioned above with respect to claim 1.

Advantageously, the adjustment of the switching unit and the impedance of that antenna element which is—due to the position of said switching unit—operated in the parasitic mode is repeated occasionally or at predetermined times. These repetitions advantageously enable a proper adaptation of the selected and adjusted impedance configuration such that the degree of performance of the predetermined signal quality criterion for the electromagnetic signal on the active path is always maximized.

Further advantageous embodiments of the invention are subject matter of the remaining dependant claims.

The description is accompanied by two figures, wherein

Figure 1:
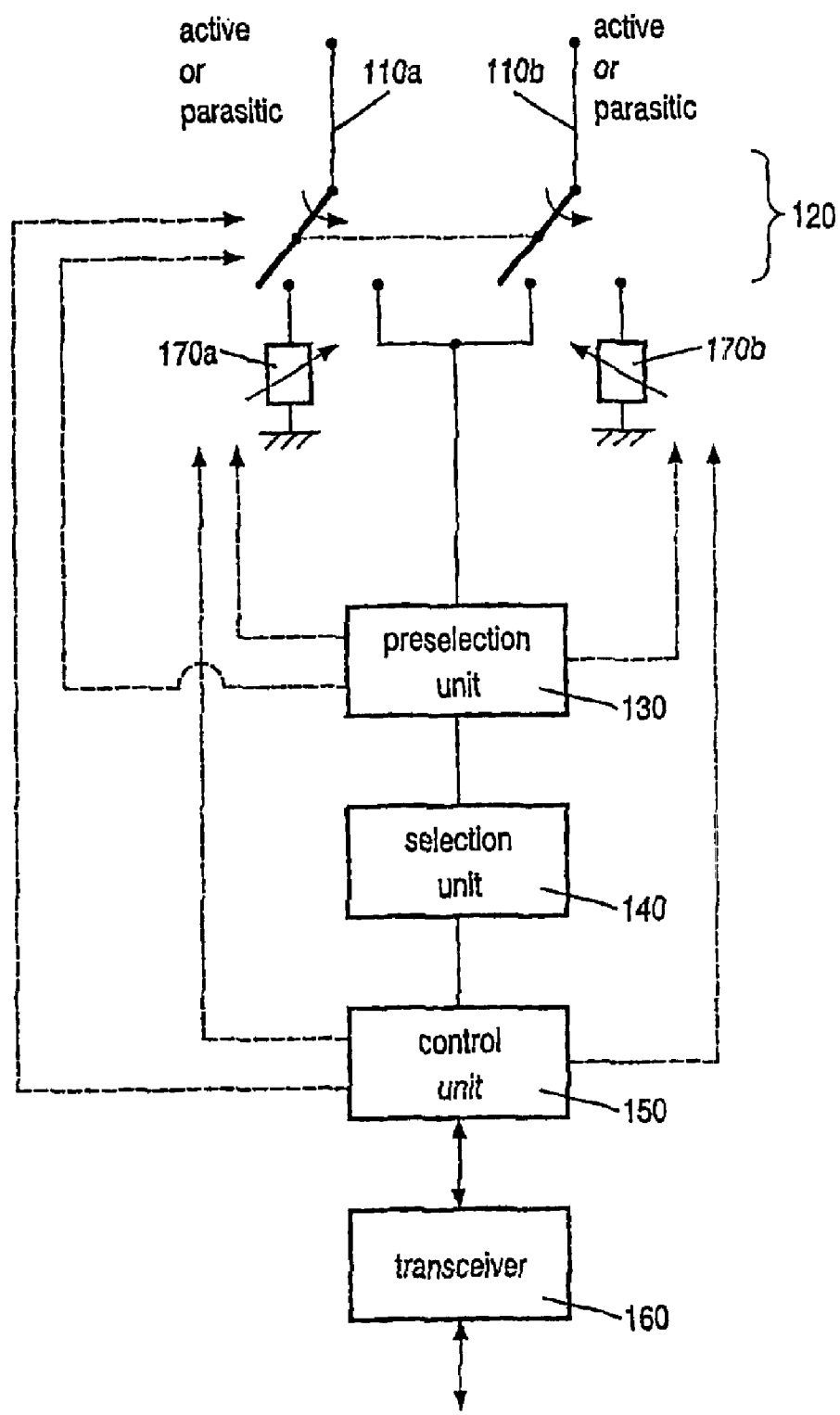

FIG. 1: shows a preferred embodiment of the antenna diversity according to the present invention; and FIG. 2: shows an antenna diversity known in the art.

In the following the preferred embodiment of the invention will be described by referring to FIG. 1.

FIG. 1 shows an antenna diversity of an electromagnetic device, in particular of wireless and cellular terminals, like phones or pagers etc. It comprises a first and a second antenna element 110a and 110b. These antenna elements are connected to a switching unit 120 for either operating the first antenna element 110a in the parasitic mode and simultaneously operating the second antenna element in the active mode or for alternatively operating the first antenna element 110a in the active mode and simultaneously operating the second antenna element 110b in the parasitic mode. The active mode and the parasitic mode have already been described above by referring to FIG. 2.

The antenna diversity of the present invention further comprises a pre-selection unit 130 for testing all available configurations of the antenna diversity and finally selecting from all tested configurations those N-configurations ensuring that the amount of a mismatch between the impedance (not shown) of the antenna element in the active mode and the impedance of the transceiver 160 of the antenna diversity is below a predetermined threshold value. A detailed description of the operation of unit 130 is given below.

The term "configuration" means a group of two parameters, wherein the first parameter represents one particular of the two possible positions of the switching unit 120 and wherein the second parameter represents the selected or adjusted amount of the impedance of that antenna element which is—due to the position of said switching unit —operated in the parasitic mode.

Further, the antenna diversity comprises a selection unit 140 for selecting that single specific configuration out of the plurality of the N-configurations provided by the pre-selection unit 130 fulfilling a predetermined signal quality criterion for the transceived electromagnetic signal best.

Moreover, the antenna diversity comprises a control unit 150 for adjusting the position of the switching unit 120 and the amount of the impedance 170a or 170b of that antenna element 110a or 110b which is operated in the parasitic mode, according to the selected specific configuration.

In the following, the operation of the pre-selection unit 130 is described in more detail. More specifically, said operation comprises the steps of:

a1) operating the first antenna element in the active mode and the second antenna element in the parasitic mode;

a2) sequentially varying the impedance of the second antenna element to n1 different amounts and detecting the co-ordinated amounts of mismatch between the impedance of the first antenna element and the impedance of the transceiver (160) as well as the coordinated degree of performance of the signal quality criterion for the electromagnetic signal transceived by the first antenna element, respectively;

b1) operating the first antenna element in the parasitic mode and the second antenna element in the active mode;

b2) sequentially varying the impedance of the first antenna element to n2 different amounts and detecting the coordinated amounts of mismatch between the impedance of the second antenna element and the impedance of the transceiver (160) as well as the co-ordinated degree of performance of the signal quality criterion for the electromagnetic signal transceived by the second antenna element, respectively; and c) selecting and providing those N configurations out of the n1+n2 configurations with N<n1+n2 the amounts of impedance mismatch of which are below a predetermined threshold value.

What is claimed is:

1. Antenna diversity of an electronic device, in particular of a cellular terminal, comprising:

a first and a second antenna element (110a, 110b) one of which being operated in an active mode by being connected to a transceiver (160) of said electronic device for transceiving electromagnetic signals whereas the other one of which being operated in a parasitic mode by interfering the impedance of the antenna element in the active mode due to electromagnetic coupling; wherein the antenna element (110a, 110b) in the parasitic mode has an adjustable impedance; characterized by a switching unit (120) for either operating the first antenna element (110a) in the parasitic mode and simultaneously operating the second antenna element (110b) in the active mode or alternatively operating the first antenna element in the active mode and simultaneously operating the second antenna element in the parasitic mode;

a pre-selection unit (130) for providing N configurations of the antenna diversity ensuring that the amount of a mismatch between the impedance of the antenna element in the active mode and the impedance of the transceiver (160) is below a predetermined threshold value, respectively, wherein each of said configurations represents a particular position of the switching unit (120) in combination with a particular predetermined amount of the impedance (170a or 170b) of that antenna element which is—due to the position of said switching unit (120)—operated in the parasitic mode;

a selection unit (140) for selecting that single specific configuration out of the plurality of the N configurations provided by the pre-selection unit (130) fulfilling a predetermined signal quality criterion for the transceived electromagnetic signal best; and a control unit (150) for adjusting the position of the switching unit (120) and the amount of the impedance (170a or 170b) of that antenna element which is—due to the position of the switching unit (120)—operated in the parasitic mode, according to the selected specific configuration.

2. Method for operating an antenna diversity as used for an electromagnetic device, in particular for a cellular terminal, the diversity including a first and a second antenna element one of which being operable in an active mode by being connected to a transceiver (160) of said electronic device for transceiving electromagnetic signals whereas the other one of which being operable in a parasitic mode by interfering the impedance of the antenna element in the active mode due to electromagnetic coupling to said antenna element in the active mode; the method being characterized by the steps of:

providing N configurations of the antenna diversity ensuring that the amount of a mismatch between the impedance of the antenna element in the active mode and the impedance of the transceiver (160) is below a predetermined threshold value, respectively, wherein each of said configurations represents a particular situation in which either the first antenna element (110*a*) is operated in the parasitic mode and simultaneously the second antenna element (110*b*) is operated in the active mode or vice versa in combination with a particular predetermined amount of the impedance (170*a*, 170*b*) of that antenna element which is currently operated in the parasitic mode;

selecting that single specific configuration out of the plurality of the N configurations fulfilling a predetermined signal quality criterion for the transceived electromagnetic signal best; and adjusting the selected specific configuration.

3. Method according to claim 2, characterized in that the method steps are repeated occasionally or after a predetermined time interval.

4. Method according to claim 2, characterized in that the step of providing the N configurations comprises the substeps of:

a1) operating the first antenna element in the active mode and the second antenna element in the parasitic mode;

a2) sequentially varying the impedance of the second antenna element to n1 different amounts and detecting the co-ordinated amounts of mismatch between the impedance of the first antenna element and the impedance of the transceiver (160) as well as the co-ordinated degree of performance of the signal quality criterion for the electromagnetic signal transceived by the first antenna element, respectively;

b1) operating the first antenna element in the parasitic mode and the second antenna element in the active mode;

b2) sequentially varying the impedance of the first antenna element to n2 different amounts and detecting the co-ordinated amounts of mismatch between the impedance of the second antenna element and the impedance of the transceiver (160) as well as the co-ordinated degree of performance of the signal quality criterion for the electromagnetic signal transceived by the second antenna element, respectively; and c) selecting and providing those N configurations out of the n1+n2 configurations with $N \leq n1+n2$ the amounts of impedance mismatch of which are below a predetermined threshold value.

* * * * *